United States Patent
Fujio et al.

(10) Patent No.: US 10,165,266 B2
(45) Date of Patent: Dec. 25, 2018

(54) IMAGE PROCESSING DEVICE, IMAGE PROCESSING SYSTEM, AND NON-TRANSITORY COMPUTER READABLE STORAGE MEDIUM

(71) Applicant: FUJI XEROX CO., LTD., Tokyo (JP)

(72) Inventors: Makoto Fujio, Kanagawa (JP); Noriko Sakai, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/455,227

(22) Filed: Mar. 10, 2017

(65) Prior Publication Data

US 2018/0048887 A1    Feb. 15, 2018

(30) Foreign Application Priority Data

Aug. 10, 2016    (JP) .................. 2016-157240

(51) Int. Cl.
*H04N 17/02* (2006.01)
*H04N 17/04* (2006.01)
(Continued)

(52) U.S. Cl.
CPC .............. *H04N 17/04* (2013.01); *G01J 3/462* (2013.01); *H04N 1/6011* (2013.01); *H04N 1/6027* (2013.01); *H04N 1/6044* (2013.01); *H04N 1/646* (2013.01); *H04N 17/02* (2013.01); *H04N 1/6077* (2013.01); *H04N 2201/0005* (2013.01); *H04N 2201/0089* (2013.01)

(58) Field of Classification Search
CPC .... H04N 17/04; H04N 1/6011; H04N 1/6044; H04N 1/646; H04N 2201/0005; H04N 2201/0089; G01J 3/462

USPC ................................................. 348/189–191
See application file for complete search history.

(56) References Cited

U.S. PATENT DOCUMENTS 6,014,168 A * 1/2000 Webb ..................... H01J 9/44
                                                                348/190
6,130,961 A * 10/2000 Akioka ................ G06T 11/001
                                                                382/167
(Continued)

FOREIGN PATENT DOCUMENTS

JP          2003-87591 A       3/2003

*Primary Examiner* — Michael Lee
(74) *Attorney, Agent, or Firm* — Sughrue Mion, PLLC

(57) ABSTRACT

An image processing device includes
a color reproduction characteristic acquiring unit that acquires a color reproduction characteristic of a display device,
a color reproduction characteristic correction unit that corrects the color reproduction characteristic,
a feature amount extraction unit that extracts a feature amount which is an object of the correction of the color reproduction characteristic acquired by the color reproduction characteristic acquiring unit, and
an evaluation image selecting unit that selects, based on the feature amount, an evaluation image which is a source for generating a confirmation image including (i) an image when the color reproduction characteristic acquired by the color reproduction characteristic acquiring unit and before the correction is used and (ii) an image when the color reproduction characteristic after the correction by the color reproduction characteristic correction unit is used.

17 Claims, 12 Drawing Sheets

(51) Int. Cl.
*G01J 3/46* (2006.01)
*H04N 1/60* (2006.01)
*H04N 1/64* (2006.01)

(56) References Cited

U.S. PATENT DOCUMENTS

| | | | |
|---|---|---|---|
| 9,330,616 B2* | 5/2016 | Horikawa | G09G 3/3607 |
| 2003/0053094 A1 | 3/2003 | Ohga et al. | |
| 2012/0218320 A1* | 8/2012 | Evanicky | G09G 3/006 |
| | | | 345/690 |
| 2014/0240340 A1* | 8/2014 | Shirasawa | H04N 1/6058 |
| | | | 345/590 |
| 2014/0375672 A1* | 12/2014 | Sakai | H04N 1/603 |
| | | | 345/590 |
| 2017/0124709 A1* | 5/2017 | Rithe | G06K 9/2036 |

* cited by examiner

FIG.6A
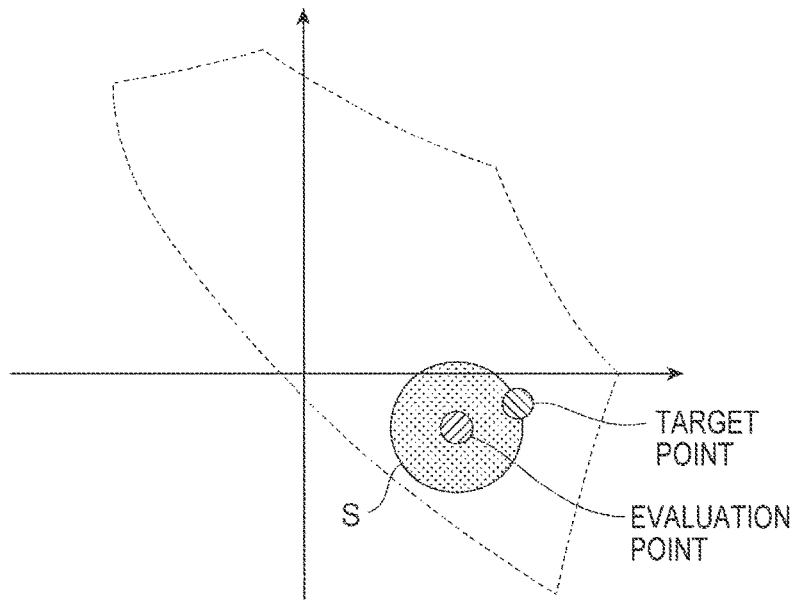
TARGET POINT
EVALUATION POINT
S
FIG.6B
⇩ SEARCH
| No. | REPRESENTATIVE COLOR 1 | | REPRESENTATIVE COLOR 2 | | REPRESENTATIVE COLOR 3 | |
|---|---|---|---|---|---|---|
| | Lab | AREA | Lab | AREA | Lab | AREA |
| COLOR 1 | Lab(30,38,83) | 30 | Lab(28,42,-23) | 20 | Lab(60,5,-25) | 10 |
| COLOR 2 | Lab(50,-20,40) | 30 | Lab(77,-69,20) | 20 | Lab(20,-5,80) | 10 |
| ⋮ | ⋮ | ⋮ | ⋮ | ⋮ | ⋮ | ⋮ |
| COLOR N | Lab(70,-20,-43) | 30 | Lab(50,-30,0) | 20 | Lab(50,-2,-45) | 10 |
FIG.6C
⇩ SELECT
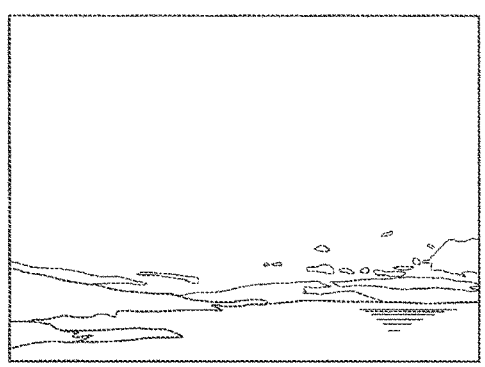

FIG.8A
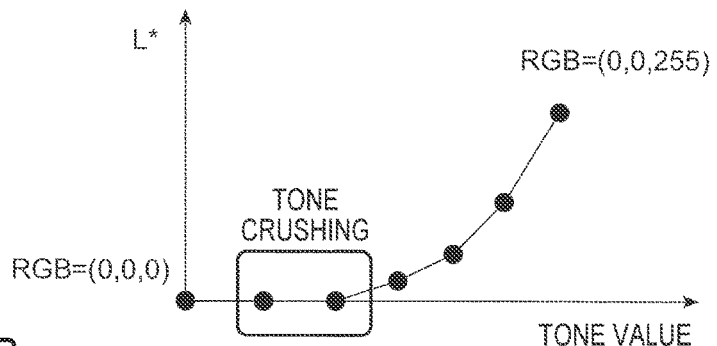
FIG.8B
⇩ SEARCH
| No. | COLOR | TONE REPRODUCTION RANGE(0~255) |
|---|---|---|
| TONE 1 | B | 0~5 |
| TONE 2 | B | 0~10 |
| TONE 3 | B | 0~15 |
| TONE 4 | G | 0~5 |
| ⋮ | ⋮ | ⋮ |
| TONE N | R | 0~15 |
⇩ SELECT
FIG.8C
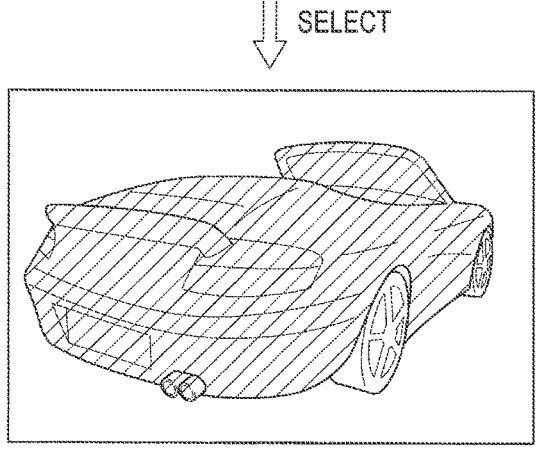

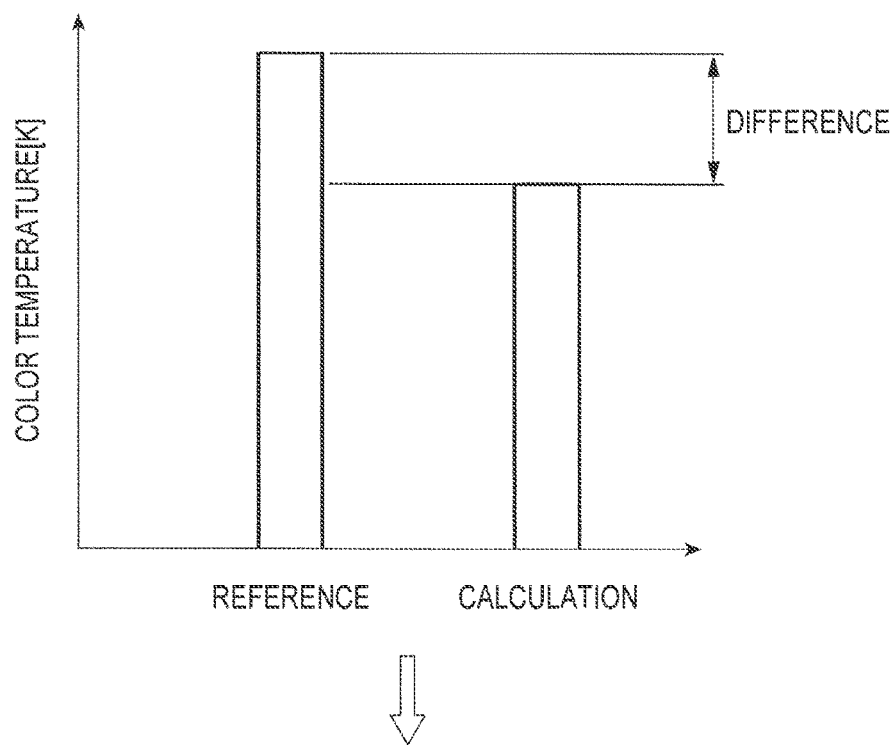

ically embodiment;
IMAGE PROCESSING DEVICE, IMAGE PROCESSING SYSTEM, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2016-157240 filed Aug. 10, 2016.

BACKGROUND

Technical Field

The present invention relates to an image processing device, an image processing system, and a non-transitory computer readable storage medium.

SUMMARY

According to an aspect of the invention, an image processing device includes a color reproduction characteristic acquiring unit that acquires a color reproduction characteristic of a display device, a color reproduction characteristic correction unit that corrects the color reproduction characteristic, a feature amount extraction unit that extracts a feature amount which is an object of the correction of the color reproduction characteristic acquired by the color reproduction characteristic acquiring unit, and an evaluation image selecting unit that selects, based on the feature amount, an evaluation image which is a source for generating a confirmation image including (i) an image when the color reproduction characteristic acquired by the color reproduction characteristic acquiring unit and before the correction is used and (ii) an image when the color reproduction characteristic after the correction by the color reproduction characteristic correction unit is used.

BRIEF DESCRIPTION OF THE DRAWINGS

Exemplary embodiments of the present invention will be described in detail based on the following figures, wherein:

FIGS. 6A to 6C are views illustrating a method of selecting an evaluation image when a color deviation occurs as a defect;

FIGS. 8A to 8C are views illustrating a method of selecting an evaluation image when tone crushing occurs as a defect;

FIGS. 12A and 12B are views illustrating a method of selecting an evaluation image when a color temperature deviation occurs as a defect.

DETAILED DESCRIPTION

Hereinafter, exemplary embodiments of the invention will be described in detail with reference to the accompanying drawings.

<Description of Entire Image Processing System>

Figure 1:
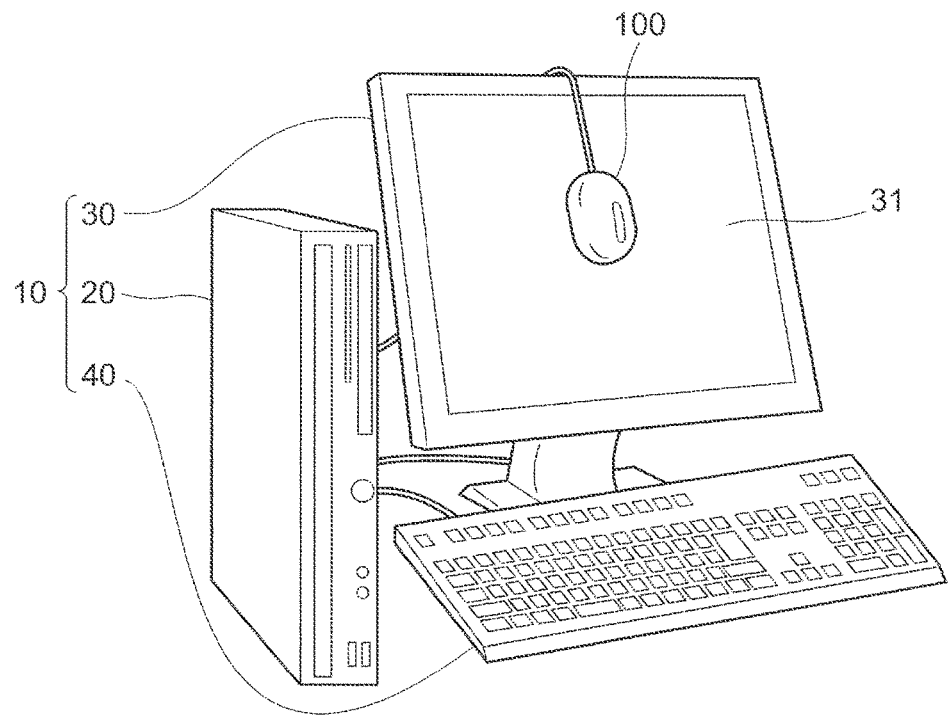
FIG. 1 is a view illustrating an exemplary configuration of an image processing system in an exemplary embodiment.

FIG. 1 is a view illustrating an exemplary configuration of an image processing system 10 to which an exemplary embodiment of the invention is applied.

The image processing system 10 includes a computer device 20 that generates image data for display, a display device 30 that displays an image based on the image data generated by the computer device 20 on a display screen 31, and an input device 40 that receives, for example, an input to the computer device 20.

In the image processing system 10, the computer device 20 and the display device 30 are connected to each other via a digital visual interface (DVI), and the computer device 20 and the input device 40 are connected to each other via a universal serial bus (USB). In addition, instead of the DVI, the computer device 20 and the display device 30 may be connected to each other via a high-definition multimedia interface (HDMI) (registered trademark) or a display port.

The computer device 20 which is an example of the image processing device is a so-called general-purpose personal computer which is widely used. The computer device 20 generates image data by operating various kinds of application software under the control of the operating system (OS).

In addition, the display device 30 is configured to have a function of displaying an image by an additive color mixture, such as a liquid crystal display for a PC, a liquid crystal television, or a projector. Thus, the display method in the display device 30 is not limited to the liquid crystal method. Here, in the present exemplary embodiment, it is assumed that the display device 30 displays an image by using three colors of red R, green G, and blue B. In addition, in that FIG. 1 illustrates an example where a liquid crystal display for a PC is used as the display device 30, the display screen 31 is provided within the display device 30. However, when, for example, a projector is used as the display device 30, the display screen 31 is a screen or the like provided outside the display device 30.

In addition, the input device 40 may be, for example, a keyboard device illustrated in FIG. 1 or a mouse device (not illustrated).

In the image processing system 10, for example, an image based on image data generated by using the input device 40 and the computer device 20 (an image for display) is displayed on the display screen 31 of the display device 30. Here, when product design or the like is performed by using application software operated by the computer device 20, the display screen 31 of the display device 30 is required to display an image in correct colors. Thus, in the image processing system 10, a colorimetric image based on colorimetric image data generated by the computer device 20 is displayed on the display screen 31 by the display device 30, and a calibration operation for correcting colors to be displayed on the display screen 31 is performed based on a result of reading the colorimetric image displayed on the display screen 31.

In addition, in the image processing system 10 of the present exemplary embodiment, a confirmation image for confirming a result of the calibration may be displayed on the display screen 31 of the display device 30 after the calibration operation. The confirmation image, to be described in more detail later, includes images before and after the calibration which are displayed side by side. In the image processing system 10, a confirmation image based on confirmation image data generated by the computer device 20 is displayed on the display screen 31 of the display device 30. Then, a user may confirm the result of the calibration by comparing a difference between the images before and after the calibration.

Here, FIG. 1 further illustrates a colorimeter 100 that is used in the calibration operation and also used for the reading of the colorimetric image displayed on the display screen 31 of the display device 30, in addition to the image processing system 10.

The colorimeter 100 includes a sensor (not illustrated) that reads an image into three colors of red R, green G, and blue B, and is configured to be able to measure the colorimetric image displayed on the display screen 31 in a so-called full color. In addition, in the example illustrated in FIG. 1, the colorimeter 100 is suspended from the upper side of the housing of the display device 30 which is configured with a liquid crystal display for a PC, and is so-called a contact type of which a light receiving surface using the sensor is in contact with the display screen 31. In addition, in this example, the colorimeter 100 and the computer device 20 are connected to each other via a USB. The colorimeter 100 is disposed on the display screen 31 by using a suspending holder (not illustrated). For example, when a projector is used as the display device 30, the colorimeter 100 is so-called a non-contact type which captures a colorimetric image projected on a screen by using the projector at a position away from the screen.

Figure 2:
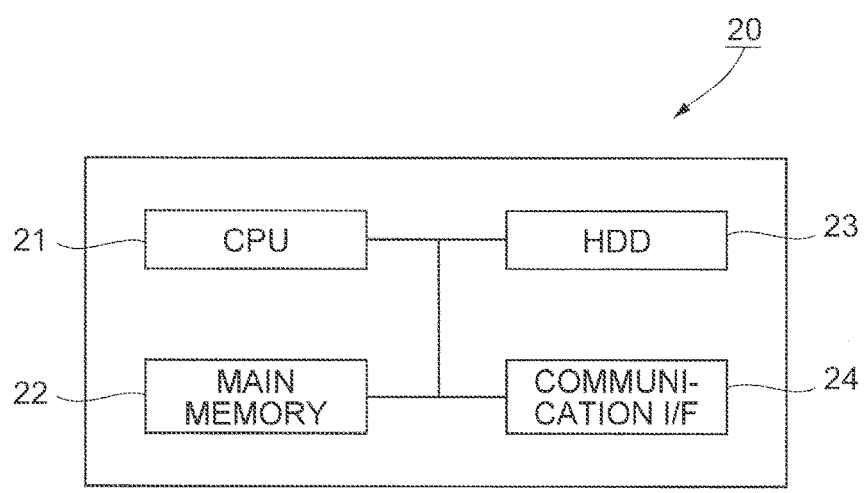
FIG. 2 is a view illustrating a hardware configuration of a computer device.

FIG. 2 is a view illustrating a hardware configuration of the computer device 20.

The computer device 20 is implemented with, for example, a personal computer as described above. As illustrated, the computer device 20 includes a central processing unit (CPU) 21 as an operation unit, and a main memory 22 and a hard disk drive (HDD) 23 as a memory. Here, the CPU 21 executes various programs such as the operating system (OS) and application software. The main memory 22 is a storage area that stores, for example, various programs and data used for execution of the programs. The HDD 23 is a storage area that stores, for example, input data for various programs and output data from various programs. Further, the computer device 20 includes a communication interface (hereinafter, referred to as a "communication I/F") 24 for communicating with external devices including the input device 40 and the display device 30.

Here, the above-described confirmation image is generated based on a set of images prepared in advance by the computer device 20. However, when the confirmation image is displayed on the display screen 31, the confirmation image may not include images matching contents of the calibration. For example, when the calibration corrects a color deviation, the confirmation image may not include a color of a corrected color region.

Figure 3:
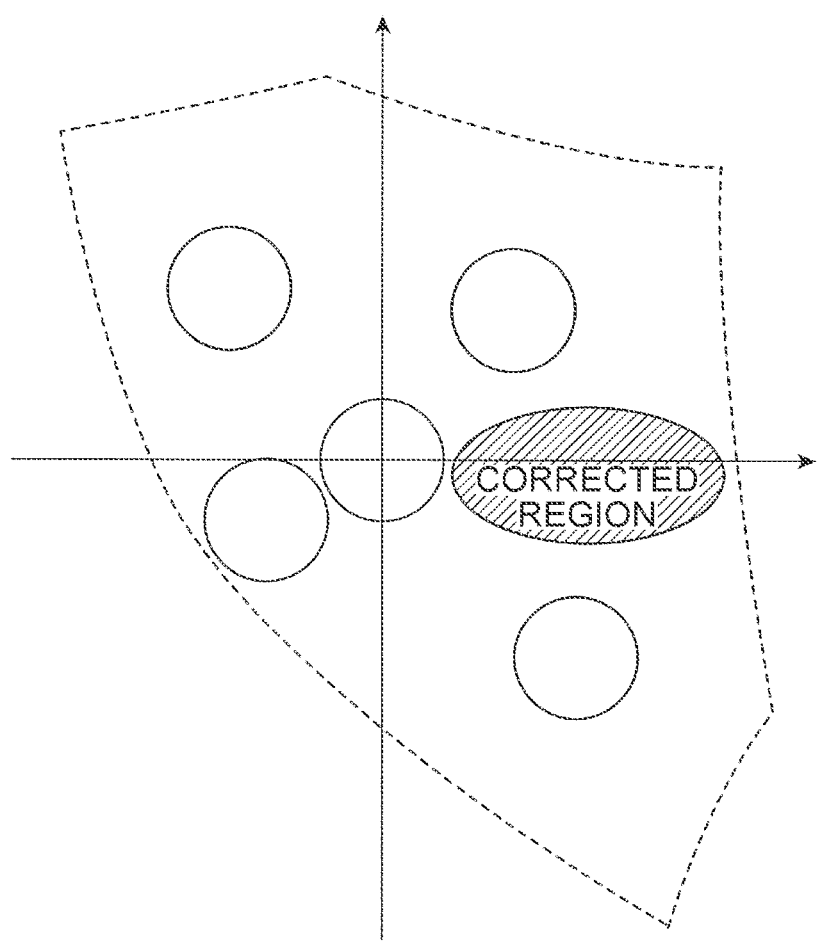
FIG. 3 is a conceptual view comparing a corrected color region and color regions of a confirmation image with each other.

FIG. 3 is a conceptual view comparing a corrected color region and color regions of a confirmation image with each other.

In FIG. 3, a color gamut of the display device 30 is represented by a dashed line. The color region in which the color deviation is corrected is illustrated as a corrected region. In addition, the color regions of the confirmation image are the inside regions of the circles. In this case, the user may not identify the effect of the correction for the color deviation even when the user views the confirmation image.

Thus, in the present exemplary embodiment, the computer device 20 generates a confirmation image suitable for the contents of calibration such that the user may easily confirm the effect of the calibration by viewing the confirmation image.

<Description of Computer Device 20>

Figure 4:
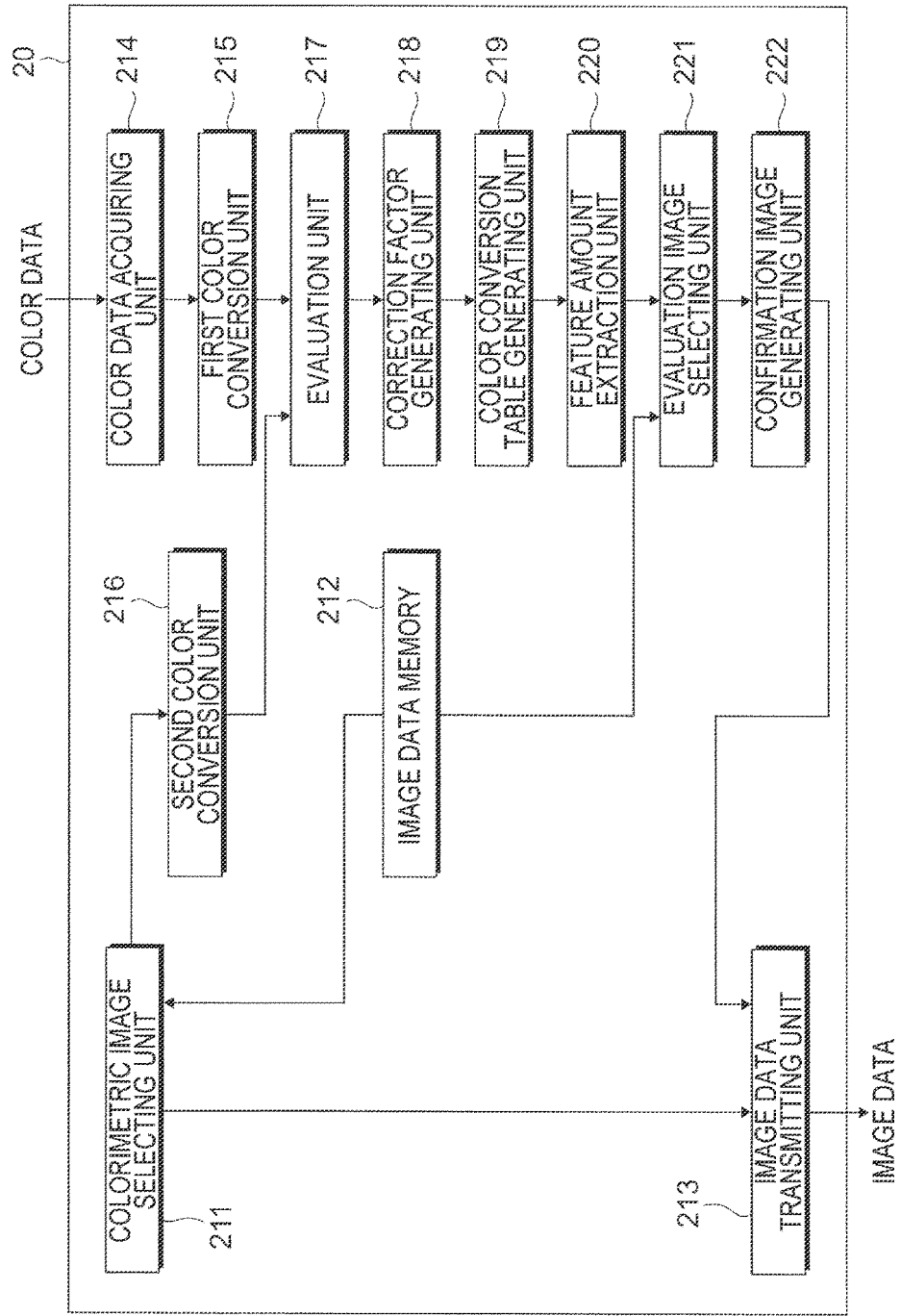
FIG. 4 is a block diagram illustrating an exemplary functional configuration of the computer device of the exemplary embodiment.

FIG. 4 is a block diagram illustrating an exemplary functional configuration of the computer device 20 of the present exemplary embodiment.

The illustrated computer device 20 includes a colorimetric image selecting unit 211, an image data memory 212, an image data transmitting unit 213, a color data acquiring unit 214, a first color conversion unit 215, a second color conversion unit 216, an evaluation unit 217, a correction factor generating unit 218, a color conversion table generating unit 219, a feature amount extraction unit 220, an evaluation image selecting unit 221, and a confirmation image generating unit 222.

The colorimetric image selecting unit 211 selects an image to be used for performing a color adjustment of the display device 30. The image to be used for the color adjustment is the above-described colorimetric image.

The image data memory 212 stores colorimetric image data which is image data of the colorimetric image selected in the colorimetric image selecting unit 211. The colorimetric image selecting unit 211 acquires the selected colorimetric image data from the image data memory 212.

The image data transmitting unit 213 outputs the colorimetric image data selected by the colorimetric image selecting unit 211 toward the display device 30, in order to perform the color adjustment of the display device 30. The colorimetric image data is outputted as $R_0$, $G_0$, and $B_0$ which are color signals of R, G, and B in an RGB color space.

The display device 30 sequentially displays colorimetric images based on the colorimetric image data transmitted by the image data transmitting unit 213. The colorimetric images displayed by the display device 30 are read by the colorimeter 100. Then, the colorimeter 100 transmits color information (color data) acquired by reading the colorimetric images, to the computer device 20. At this time, the color data output by the colorimeter 100 is, for example, color values of X, Y and Z in an XYZ color space.

The color data acquiring unit 214 acquires the color data of the colorimetric images transmitted by the colorimeter 100, with respect to the respective colorimetric images.

The first color conversion unit 215 converts the color data of the colorimetric images acquired by the color data acquiring unit 214 into color values of a device-independent color space. In the present exemplary embodiment, the color values of X, Y, and Z in the XYZ color space which are used as the color data of the colorimetric image are converted into color values of L*, a*, and b* in a L*a*b* color space, respectively. This conversion may be performed by an already known conversion equation. Here, the color values of $L^*$, $a^*$, and $b^*$ after the conversion are $L_1^*$, $a_1^*$, and $b_1^*$, respectively. Accordingly, an correspondence relationship (a first correspondence relationship) in which the color data $R_0$, $G_0$, and $B_0$ of the colorimetric images and $L_1^*$, $a_1^*$, and $b_1^*$ are associated with each other is obtained. The first correspondence relationship represents the color reproduction characteristic of the display device 30. Thus, the color reproduction characteristic (the first correspondence relationship) is a relationship between the colorimetric image data and the color data of the image displayed when the colorimetric image data is input to the display device 30, and becomes a relationship of $(R_0, G_0, B_0)$–$(L_1^*, a_1^*, b_1)$. In addition, the first color conversion unit 215 functions as a color reproduction characteristic acquiring unit that acquires the color reproduction characteristic of the display device 30.

In addition, the respective color values of $L_1^*$, $a_1^*$, $b_1^*$ may be directly output by the colorimeter 100. In this case, the conversion of the color values in the first color conversion unit 215 is not required.

The second color conversion unit 216 converts the colorimetric image data selected by the colorimetric image selecting unit 211 into the color values of the device-independent color space. This conversion may be performed by an already known conversion equation. In the present exemplary embodiment, the color values of R, G, and B in the RGB color space which are used as the colorimetric image data are converted into color values of $L^*$, $a^*$, and $b^*$ in the $L^*a^*b^*$ color space, respectively. Here, the color values of $L^*$, $a^*$, and $b^*$ after the conversion are $L_2^*$, $a_2^*$, and $b_2^*$, respectively. Accordingly, an correspondence relationship (a second correspondence relationship) in which the colorimetric image data of $R_0$, $G_0$, and $B_0$ and $L_2^*$, $a_2^*$, and $b_2^*$ are associated with each other is obtained. Thus, the second correspondence relationship becomes a relationship of $(R_0, G_0, B_0)$–$(L_2^*, a_2^*, b_2^*)$.

The evaluation unit 217 evaluates whether a defect occurs in the color reproducibility of the display device 30, from the color reproduction characteristic (the first correspondence relationship) and the second correspondence relationship. Specifically, the evaluation unit 217 evaluates whether a defect occurs in the color reproducibility, by evaluating a deviation amount of the color reproduction characteristic (the first correspondence relationship) from the second correspondence relationship, and comparing the deviation amount and a predetermined threshold with each other. That is, in this case, the second correspondence relationship is a target point, and the color reproduction characteristic (the first correspondence relationship) as an actual measurement value is an evaluation point to be evaluated. In addition, the evaluation unit 217 evaluates whether a defect occurs in the color reproducibility, by determining to what extent the color reproduction characteristic (the first correspondence relationship) based on an extent to which the evaluation point deviates from the second correspondence relationship as the target point.

In this case, it may be said that the evaluation unit 217 evaluates whether to calibrate the display device 30.

Evaluation items in terms of which the evaluation unit 217 evaluates whether a defect occurs in the color reproducibility will be described in more detail later. The evaluation unit 217 evaluates whether, for example, color (hue and saturation) deviation, tone crushing, tone clipping, a color temperature deviation, and tone jump occur.

The correction factor generating unit 218 derives a correction factor for performing a correction to conform the color reproduction characteristic (the first correspondence relationship) as the evaluation point to the second correspondence relationship as the target point. In this case, the correction factor generating unit 218 functions as a color reproduction characteristic correction unit that corrects the color reproduction characteristic based on the color reproduction characteristic (the first correspondence relationship) and the second correspondence relationship.

The color conversion table generating unit 219 generates a color conversion table (a conversion relationship) for converting the color of an image displayed by the display device 30, based on the correction factor derived by the correction factor generating unit 218. The color conversion table is a color conversion profile and is in the form of, for example, a direct look up table (DLUT) as a multi-dimensional table, a matrix, or a one-dimensional look up table (LUT).

The color conversion table represents a conversion of the above-described color signals of $R_0$, $G_0$, and $B_0$ into color signals of R', G', and B' after a correction. The calibration of the display device 30 is performed by using the color conversion table generated by the color conversion table generating unit 219.

The feature amount extraction unit 220 acquires a feature amount as an object of the correction of the color reproduction characteristic (the first correspondence relationship) acquired in the color reproduction characteristic acquiring unit.

Although details will be described later, when a defect is a color deviation, the feature amount is a color region where the color deviation occurs. When a defect is tone crushing, tone clipping, or tone jump, the feature amount is a tone value at which the tone is crushed, clipped or jumps. When a defect is a color temperature deviation, the feature amount is a color temperature.

The evaluation image selecting unit 221 selects, based on the feature amount, an evaluation image which is a source for generating a confirmation image including (i) an image when the color reproduction characteristic (the first correspondence relationship) acquired by the first color conversion unit 215 and before the correction is used and (ii) an image when the color reproduction characteristic after the correction by the correction factor generating unit 218 is used.

That is, the evaluation image is a base for generating a confirmation image to be actually displayed by the display device 30. When a defect is a color deviation, the evaluation image selecting unit 221 selects an image including the color of a color region where the color deviation occurs, as the evaluation image. In addition, when a defect is tone crushing, tone clipping, or tone jump, the evaluation image selecting unit 221 selects an image including a range of tone values in which the tone is crushed, clipped or jumps, as the evaluation image. In addition, when a defect is a color temperature deviation, the evaluation image selecting unit 221 selects a white image for identifying the color temperature, as the evaluation image.

The image data of the evaluation image is stored in the image data memory 212. The evaluation image selecting unit 221 acquires the image data of the selected evaluation image, from the image data memory 212.

The confirmation image generating unit 222 generates a confirmation image to be actually displayed by the display device 30. The confirmation image generating unit 222 displays (i) the image when the color reproduction characteristic before the correction (the first correspondence relationship) is used (the image representing the state before the calibration) and (ii) the image when the color reproduction characteristic after the correction is used (the image representing the state after the calibration), side by side. Also, the confirmation image generating unit 222 changes the images according to a feature amount to generate the confirmation image.

The confirmation image data that is the image data of the confirmation image generated by the confirmation image generating unit 222 is output toward the display device 30 by the image data transmitting unit 213. As a result, the confirmation image is displayed by the display device 30. Then, the user may confirm an effect of the calibration by viewing the confirmation image.

Next, an operation of the computer device 20 will be described.

Figure 5:
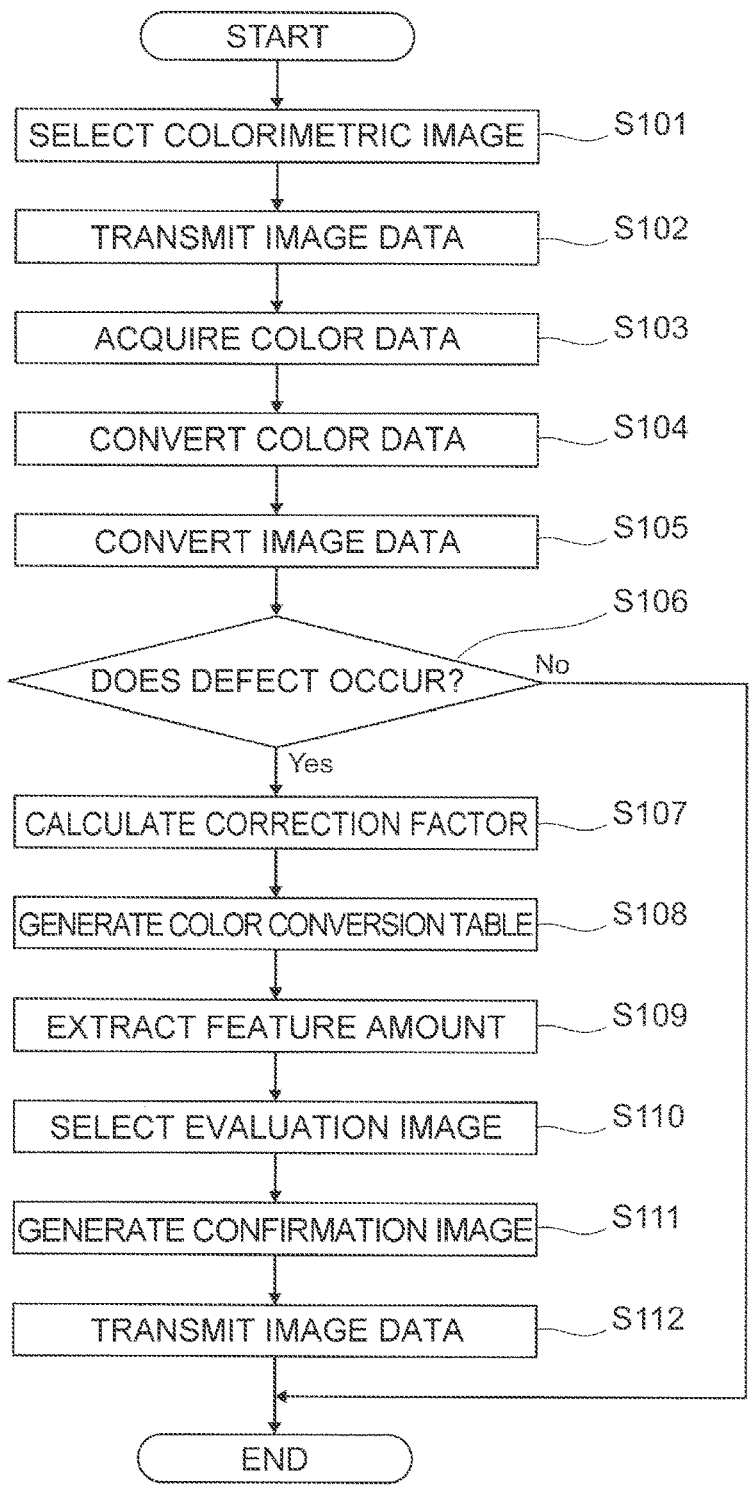
FIG. 5 is a flow chart explaining an operation of the computer device.

FIG. 5 is a flow chart explaining an operation of the computer device 20. The operation of the computer device 20 to be described below may be regarded as an image processing method performed by the image processing system 10.

First, the colorimetric image selecting unit 211 selects a colorimetric image to be used for the color adjustment of the display device 30, and acquires colorimetric image data from the image data memory 212 (step 101).

Next, the image data transmitting unit 213 sequentially transmits the colorimetric image data selected by the colorimetric image selecting unit 211 to the display device (step 102). The colorimetric image data is the color signals of $R_0$, $G_0$, and $B_0$. The display device 30 sequentially displays the colorimetric images.

The colors of the displayed colorimetric image are read by the colorimeter 100, and the colorimeter 100 transmits the color data as a colorimetry result to the computer device 20. The color data is the respective color values of X, Y, and Z.

The color data is acquired by the color data acquiring unit 214 (step 103).

Next, the first color conversion unit 215 converts the color values of X, Y, and Z which are the color data of the colorimetric image, into the color values of $L_1^*$, $a_1^*$, and $b_1^*$, respectively (step 104). Accordingly, the color reproduction characteristic (the first correspondence relationship) is obtained. Thus, the step 104 may be regarded as a color reproduction characteristic acquiring step of acquiring the color reproduction characteristic of the display device.

Meanwhile, the second color conversion unit 216 converts the color values of $R_0$, $G_0$, and $B_0$ which are the colorimetric image data, into the color values of $L_2^*$, $a_2^*$, and $b_2^*$, respectively (step 105). Accordingly, the second correspondence relationship is obtained.

Next, the evaluation unit 217 evaluates whether a defect occurs in the color reproducibility of the display device 30, from the color reproduction characteristic (the first correspondence relationship) and the second correspondence relationship (step 106).

Then, when the evaluation unit 217 evaluates that no defect occurs (No in step 106), a series of processes are ended.

Meanwhile, when the evaluation unit 217 evaluates that a defect occurs (Yes in step 106), the correction factor generating unit 218 derives a correction factor to conform the color reproduction characteristic (the first correspondence relationship) to the second correspondence relationship (step 107: a color reproduction characteristic correction step). The step 107 may be regarded as a color reproduction characteristic correction step of correcting the color reproduction characteristic.

Then, the color conversion table generating unit 219 generates a color conversion table (a conversion relationship) for converting the color of the image displayed by the display device 30, based on the derived correction factor (step 108).

In addition, the feature amount extraction unit 220 extracts a feature amount as an object of the correction of the color reproduction characteristic (the first correspondence relationship) (step 109). The step 109 may be regarded as a feature amount extraction step of extracting a feature amount as an object of the correction of the color reproduction characteristic acquired in the color reproduction characteristic acquiring step.

Next, the evaluation image selecting unit 221 selects the evaluation image based on the feature amount, and acquires the image data of the evaluation image from the image data memory 212 (step 110). The step 110 may be regarded as an evaluation image selection step of selecting, based on the feature amount, the evaluation image which is a source for generating a confirmation image including (i) the image when the color reproduction characteristic acquired in the color reproduction characteristic acquiring step and before the correction is used and (ii) the image when the color reproduction characteristic after the correction by the color reproduction characteristic correction step is used.

In addition, the confirmation image generating unit 222 generates a confirmation image to be actually displayed by the display device 30 (step 111).

Then, the image data transmitting unit 213 transmits the confirmation image data which is the image data of the confirmation image, to the display device 30 (step 112). As a result, the confirmation image is displayed by the display device 30.

EXAMPLES

Hereinafter, the present invention will be described in more detail by using examples. However, the present invention is not limited to the examples as long as they are not deviated from the gist of the present invention.

Example 1

Example 1 describes a method of selecting an evaluation image when a color deviation occurs as a defect.

FIGS. 6A to 6C are views illustrating a method of selecting an evaluation image when a color deviation occurs as a defect.

Of the drawings, FIG. 6A illustrates a color region where a color deviation occurs. The region represented by a dashed line is the color gamut of the display device 30. FIG. 6A further illustrates the evaluation point that is evaluated by the evaluation unit 217 to be a point where the color deviation occurs as a defect, together with the target point. The evaluation unit 217 calculates a deviation amount of a color value between the evaluation point and the target point. When the deviation amount is larger than a predetermined threshold value, the evaluation unit 217 evaluates that a color deviation occurs as a defect.

In addition, the color region where the color deviation occurs is represented by a circular color region S. The color region S is determined in a predetermined range based on the illustrated evaluation point. In this case, the predetermined range is a color region having a predetermined Euclidean distance from the evaluation point. The color region is the feature amount to be extracted by the feature amount extraction unit 220.

Based on the feature amount, the evaluation image selecting unit 221 selects the image including the color of the color region where the color deviation occurs, as the evaluation image.

FIG. 6B is a view illustrating a list of evaluation images stored in the image data memory 212.

In the illustrated list, N evaluation images of "Color 1" to "Color N" are provided. In the list, the item "No." indicating "Color 1" to "Color N" is described, and three extracted representative colors which are included in the respective evaluation images are described as "Representative Color 1" to "Representative Color 3," from the left side. The representative color of each of "Representative Color 1" to "Representative Color 3" is represented as L*, a*, and b* (simply illustrated as "Lab" in FIG. 6B), and an area where the representative color is used is described.

Based on the list, the evaluation image selecting unit 221 selects the image including the color of the color region where the color deviation occurs, as the evaluation image. Specifically, it is assumed that the above-described evaluation point is (L*, a*, b*)=(30, 40, −20). Then, the evaluation image selecting unit 221 selects, as the evaluation image, "Color 1" which includes (L*, a*, b*)=(28, 42, −23) that is the color of the color region where the color deviation occurs, as "Representative Color 2."

In addition, FIG. 6C illustrates "Color 1" which is the selected evaluation image. The evaluation image is a sunset image and is entirely in red. That is, since the evaluation point (L*, a*, b*)=(30, 40, −20) is red, and "Color 1" includes the red color, "Color 1" is suitable as the evaluation image.

Figure 7:
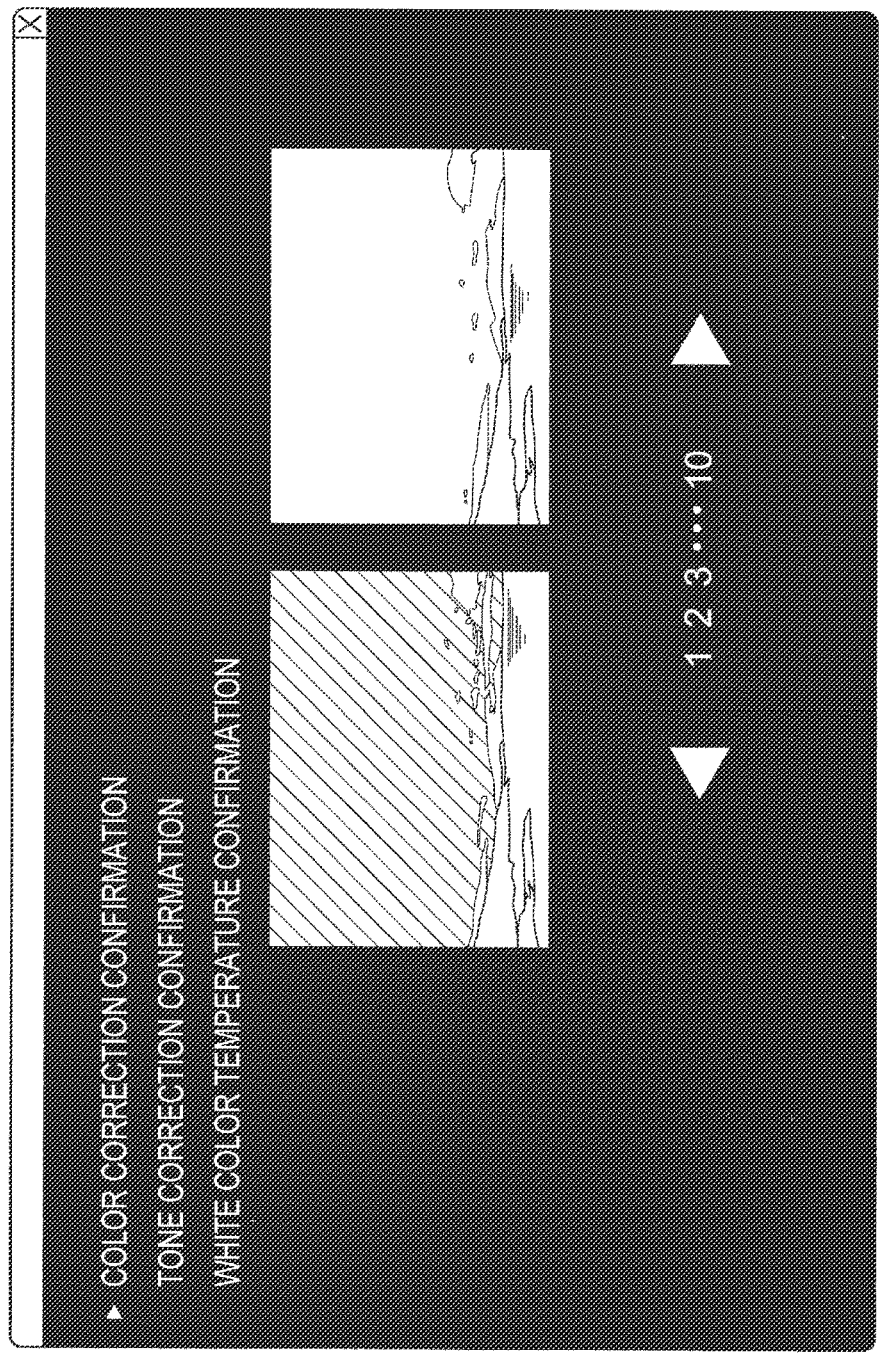
FIG. 7 is a view illustrating an exemplary confirmation image generated based on the evaluation image selected in FIG. 6C.

FIG. 7 is a view illustrating an exemplary confirmation image that has been generated based on the evaluation image selected in FIG. 6C.

The illustrated confirmation image is displayed on the display screen 31 of the display device 30. In the confirmation image, the item "Color Correction Confirmation" which is contents indicated by the confirmation image is displayed on the upper left side of the screen. In addition, the image when the color reproduction characteristic before the correction (the first correspondence relationship) is used (the image representing the state before the calibration) is displayed on the left side of the center of the screen. Further, the image when the color reproduction characteristic after the correction is used (the image representing the state after the calibration) is displayed on the right side of the center of the screen. That is, the two images are displayed side by side in the horizontal direction. In addition, the numerical values 1 to 10 are displayed on the lower portion of the screen. The numerical values are displayed to confirm a degree of color correction on the screen, and the degree of color correction is changed by selecting the two icons represented in triangles with a mouse or the like. In this case, through the operation, the user may change the degree of color correction.

Example 2

Example 2 describes a method of selecting an evaluation image when tone crushing occurs as a defect.

FIGS. 8A to 8C are views illustrating a method of selecting an evaluation image when tone crushing occurs as a defect.

Of the drawings, FIG. 8A illustrates tone characteristics when a tone is crushed. FIG. 8A illustrates lightness (L*) of an image which is displayed when RGB data in which tone values of the colors R and G are set to zero (0) while changing a tone value of the color B is used as colorimetric image data. That is, the colorimetric image data is changed in the range of (R, G, B)=(0, 0, 0) to (R, G, B)=(0, 0, 255). In FIG. 8A, the horizontal axis represents the tone value of the color B, and the vertical axis represents the lightness (L*).

In FIG. 8A, in the region where the tone value is small, there is a place where the lightness hardly changes even when the tone value increases. In the place, even when the tone value changes, the lightness of the displayed image hardly changes, and the displayed image may not express the tone. That is, a tone is crushed in the displayed image.

When a difference of the lightness between adjacent evaluation points (the points represented by black circles in FIG. 8A) in the region where the tone value is small (a low tone region) is equal to or smaller than a predetermined threshold value, the evaluation unit 217 evaluates that the tone crushing occurs as a defect. In FIG. 8A, the tone is crushed in the place indicated by a rectangle. Here, the feature amount extraction unit 220 extracts a maximum tone value in the place where the tone is crushed, as the feature amount. In this case, the feature amount extraction unit 220 extracts the tone value of 10 as the feature amount.

Based on the feature amount, the evaluation image selecting unit 221 selects an image including the tone value of the feature amount, as the evaluation image.

FIG. 8B is a view illustrating a list of evaluation images stored in the image data memory 212.

In the illustrated list, N evaluation images of "Tone 1" to "Tone N" are provided. In the list, from the left side, the item "No." indicating "Tone 1" to "Tone N," a color (any one of R, G, and B) suitable for confirmation of an evaluation image, and a tone reproduction range are described.

Based on the list, the evaluation image selecting unit 221 selects an image including the tone value of the feature amount, as the evaluation image. Specifically, the evaluation image selecting unit 221 selects, for example, "Tone 2" which is the color B and includes the tone value of 10 as the feature amount, as the evaluation image.

In addition, FIG. 8C illustrates "Tone 2" which is the selected evaluation image. The evaluation image is an image of a car which is painted blue. The portion which is painted blue is entirely dark and has a low tone value. That is, since Tone 2 includes the tone value of 10 as the evaluation point, Tone 2 is suitable as the evaluation image.

In the above-described example, the tone crushing is evaluated for each of the colors R, G, and B. However, the present invention is not limited thereto, and there is also a method which does not evaluate the tone crushing for each color.

Figures 9A, 9B:
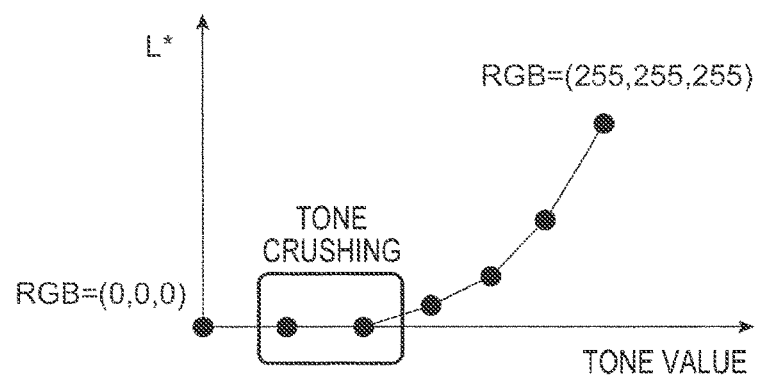
FIGS. 9A and 9B are views illustrating another method of selecting an evaluation image when tone crushing occurs as a defect.

FIGS. 9A and 9B are views illustrating another method of selecting an evaluation image when tone crushing occurs as a defect.

In FIG. 9A, the horizontal axis represents a tone value, and the vertical axis represents the lightness (L*). FIG. 9A illustrates a lightness (L*) which is displayed when RGB data in which the tone values of the respective colors R, G, and B are changed to have an identical value is used as colorimetric image data. That is, the colorimetric image data is changed in the range of (R, G, B)=(0, 0, 0) to (R, G, B)=(255, 255, 255). That is, in this case, the tone crushing is evaluated for the gray color.

In this case as well, in the region where the tone value is small (the low tone region), there is a place where the lightness hardly changes even when the tone value increases, and tone crushing occurs in the place.

In this case as well, when a difference of the lightness between adjacent evaluation points (the points indicated by black circles in FIG. 9A) is equal to or smaller than a predetermined threshold value, the evaluation unit 217 evaluates that tone crushing occurs as a defect. In FIG. 8A, the tone is crushed in the place indicated by a rectangle. Similarly, the feature amount extraction unit 220 extracts a maximum tone value in the place where the tone crushing occurs, as the feature amount. In this case, the feature amount extraction unit 220 extracts the tone value of 10 as the feature amount.

Based on the feature amount, the evaluation image selecting unit 221 selects an image including the tone value of the feature amount, as the evaluation image.

FIG. 9B is a view illustrating a relationship between a crush level and a feature amount.

The upper column of FIG. 9B represents the crush level. In this case, the crush level is set from 1 to 5. As the numerical value increases, the degree of tone crushing is large, and as the numerical value decreases, the degree of tone crushing is small. Then, a feature amount corresponding to the crush level is set.

The evaluation image selecting unit 221 selects the evaluation image based on the crush level. In this case, since the feature amount is the tone value of 10, the feature amount corresponds to the crush level 2, and the evaluation image corresponding to the crush level 2 is selected.

Figure 10:
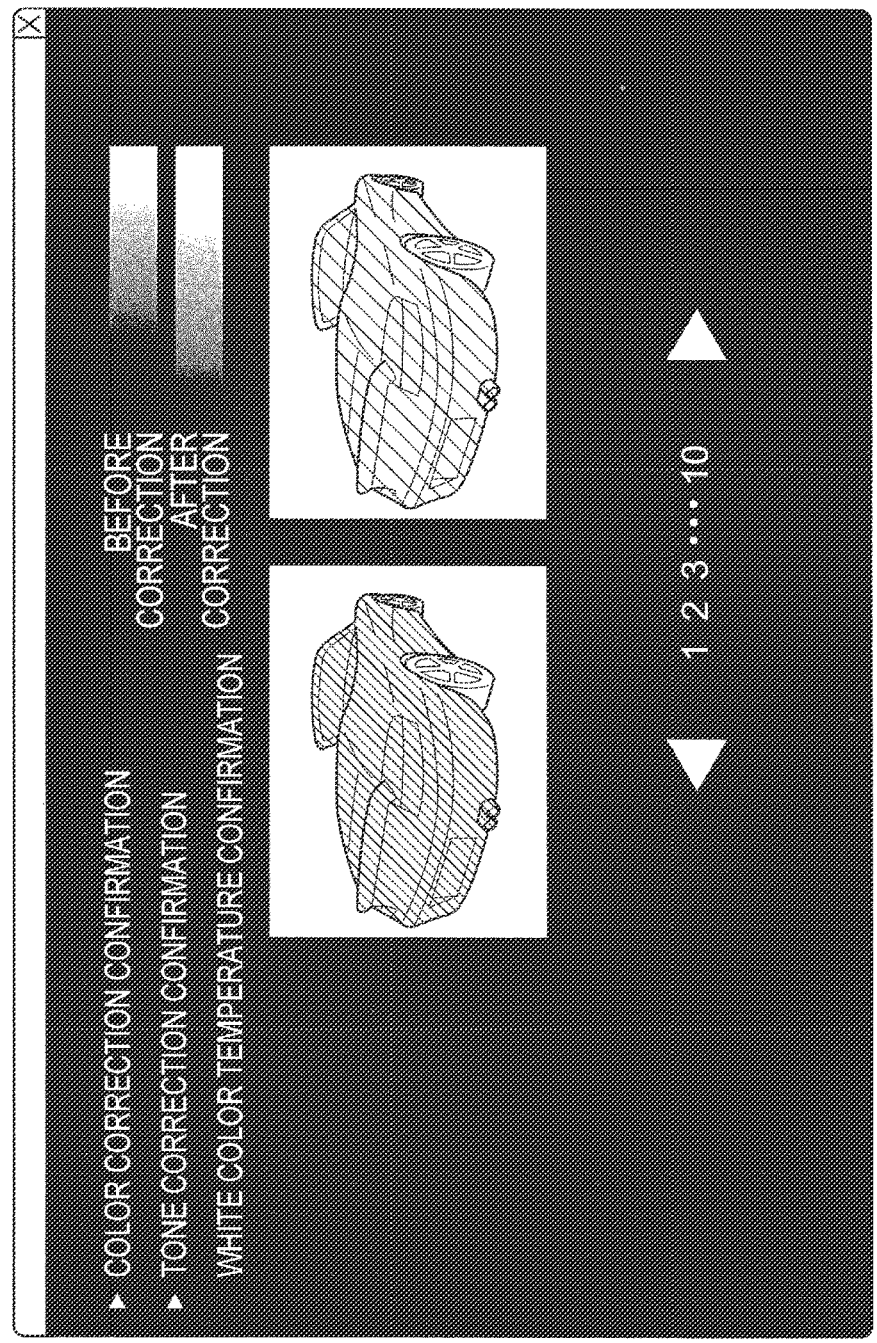
FIG. 10 is a view illustrating an exemplary confirmation image generated based on the evaluation image selected in FIG. 8C.

FIG. 10 is a view illustrating an exemplary confirmation image generated based on the evaluation image selected in FIG. 8C.

In the illustrated confirmation image, the item "Tone Correction Confirmation" which is contents indicated by the confirmation image is displayed on the upper left side of the screen. In addition, the image when the color reproduction characteristic before the correction (the first correspondence relationship) is used (the image representing the state before the calibration) is displayed on the left side of the center of the screen. Further, the image when the color reproduction characteristic after the correction is used (the image representing the state after the calibration) is displayed on the right side of the center of the screen. That is, the two images are displayed side by side in the horizontal direction.

Here, the image when the color reproduction characteristic before the correction (the first correspondence relationship) is used (the image representing the state before the calibration) is displayed as "Before Correction" on the upper portion of the central upper side of the screen. This is a tone image representing the tone characteristics before the correction in gradation. Similarly, the image when the color reproduction characteristic after the correction is used (the image representing the state after the calibration) is displayed as "After Correction" on the lower portion of the central upper side of the screen. This is a tone image representing the tone characteristic after the correction in gradation. That is, the two images are displayed side by side in the vertical direction. In addition, as to a place other than the evaluation point, a tone image represented in gradation by performing an interpolation processing may be generated.

FIGS. 11A to 11D are views illustrating a method of generating the tone image illustrated in FIG. 10.

Figure 11C:
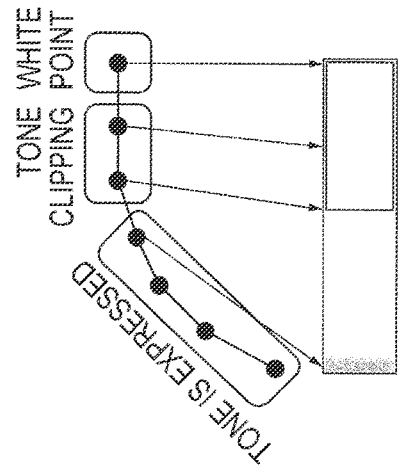
FIGS. 11A to 11D are views illustrating a method of generating tone images illustrated in FIG. 10.
Figure 11D:
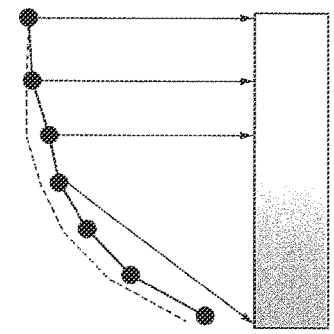
Figure 11A:
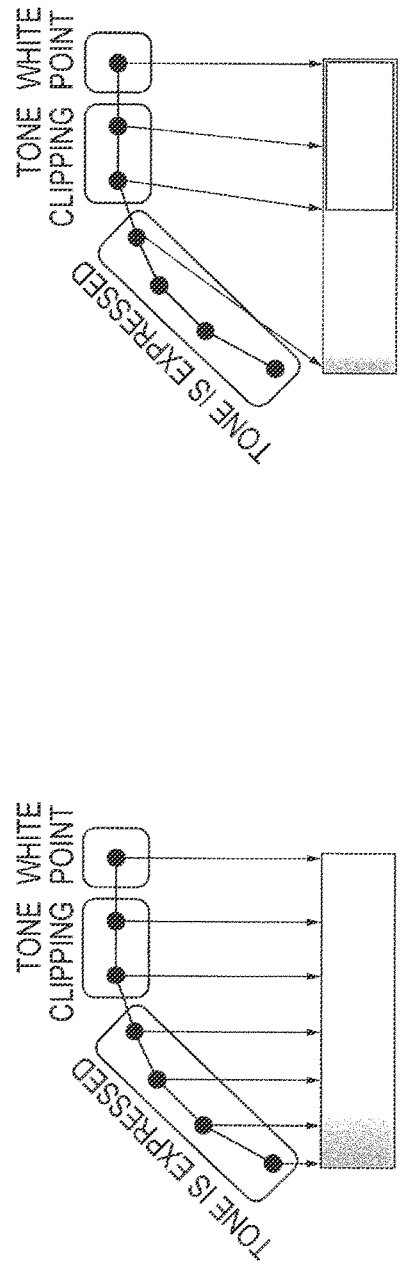
Figure 11B:

Of the drawings, FIGS. 11A and 11B illustrate a method generally used for generating a tone image. FIG. 11A illustrates a case where a tone image is generated as the image representing the state before the calibration (correction). FIG. 11B illustrates a case where a tone image is generated as the image representing the state after the calibration (correction).

In FIG. 11A, in the region where the tone value is small (the low tone region), as the tone value increases, the lightness also increases, and the displayed image may express the tone. However, in the region where the tone value is large (the high tone region), there is a place where the lightness hardly changes even when the tone value increases. In this place, the displayed image may not express the tone, and the image is displayed with the saturation lightness. That is, a tone is clipped in the displayed image. When a difference of the lightness between adjacent evaluation points (points represented by black circles in FIG. 11A) in the region where the tone value is large (the high tone region) is equal to or smaller than a predetermined threshold value, the evaluation unit 217 evaluates that tone clipping occurs as a defect.

Meanwhile, in FIG. 11B, the calibration is performed to prevent the tone from being clipped in the region where the tone value is large (the high tone region).

In FIG. 11A or 11B, the tone image is generated according to the lightness corresponding to each tone value. That is, the left end of the tone image has the lightness which is taken when the tone value is zero (0), and the right end of the tone image has the lightness which is taken when the tone value is 255. Since the lightness corresponding to each tone value does not largely change in FIGS. 11A and 11B, a confirmation image in which the difference between the two tone images is not clearly identified is generated.

In addition, FIGS. 11C and 11D illustrate a case where another method is adopted to generate a tone image. FIG. 11C illustrates a case where a tone image is generated as the image representing the state before the calibration (correction). FIG. 11D illustrates a case where a tone image is generated as the image representing the state after the calibration (correction).

In FIG. 11A or 11B, the left end of the tone image has the lightness when the tone value is the largest in the range in which the tone may be expressed. That is, the lightness of the left end of the tone image is not the lightness when the tone value is zero (0). Meanwhile, the right end of the tone image has the lightness when the tone value is 255. In this case, in FIGS. 11C and 11D, the tone images are generated by enlarging the place where the calibration has been performed, and a confirmation image in which the difference between the two tone images is easily identified is generated. In addition, here, one tone value which is the largest in the range in which the tone may be expressed is used in generating the tone image. However, plural tone values may be used.

Example 3

Example 3 describes a method of selecting an evaluation image when a color temperature deviation occurs as a defect.

FIGS. 12A and 12B are views illustrating a method of selecting an evaluation image when a color temperature deviation occurs as a defect.

Of the drawings, FIG. 12A is a view comparing a reference color temperature and a color temperature calculated based on the color data with each other, when the evaluation unit 217 evaluates that a color temperature deviation occurs as a defect. The evaluation unit 217 calculates a difference between the reference color temperature and the calculated color temperature as a deviation amount of a color temperature. When the deviation amount is larger than a predetermined threshold value, the evaluation unit 217 evaluates that a color temperature deviation occurs as a defect. In this case, the color temperature or the difference in color temperature is the feature amount extracted by the feature amount extraction unit 220.

Based on the feature amount, the evaluation image selecting unit 221 selects an image corresponding to the color temperature deviation, as the evaluation image.

FIG. 12B is a view illustrating a relationship between a degree of influence and a difference in color temperature.

The upper column of FIG. 12B shows the degree of influence. In this case, the degree of influence is set from 1 to 5. As the numerical value increases, the degree of influence increases, and as the numerical value decreases, the degree of influence decreases. In addition, the difference in color temperature is set as a feature amount corresponding to the degree of influence.

The evaluation image selecting unit 221 selects an evaluation image based on the degree of influence.

Figure 13:
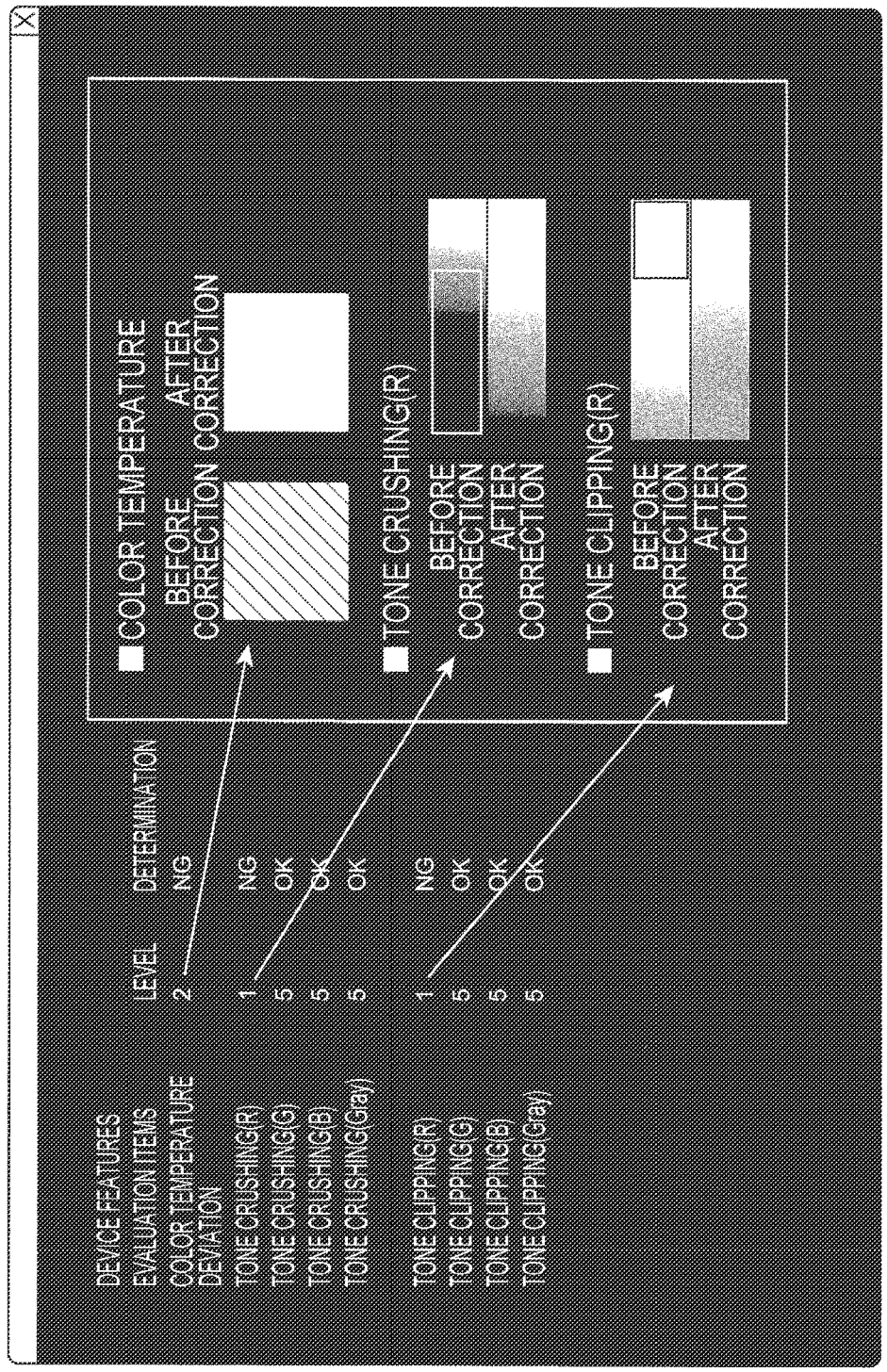
FIG. 13 is a view illustrating an exemplary confirmation image according to Example 3.

FIG. 13 is a view illustrating an exemplary confirmation image according to Example 3.

In addition, FIG. 13 illustrates a case where confirmation images for the tone crushing and confirmation images for the tone clipping are displayed together with confirmation images for the color temperature.

In the illustrated confirmation images, evaluation results for the evaluation items of the color temperature deviation, the tone crushing, and the tone clipping are displayed on the left side of the screen. In addition, the colors R, G, and B, and the gray color are evaluated for the tone crushing and the tone clipping. The evaluation results are represented as numerical values of levels 1 to 5, and represented as "OK" when no defect occurs and "NG" when a defect occurs. As the numerical values of the levels decrease, the degree decreases, and it is evaluated that no defect occurs. Meanwhile, as the numerical values of the levels increases, the degree increases, and it is evaluated that a defect occurs.

At the center of the screen, the confirmation images for the color temperature, the confirmation images for the tone crushing, and the confirmation images for the tone clipping are displayed from the upper side.

The confirmation images for the color temperature are white images before and after the calibration (correction) which are displayed side by side in the horizontal direction.

In addition, the confirmation images for the tone crushing and the confirmation images for the tone clipping are the above-described tone images which are displayed side by side in the vertical direction. In the confirmation images, a place where the tone is clipped or crushed is indicated by a rectangle in the confirmation image before the correction, so that the user may easily identify the place.

In addition, the background of the images may be in black as illustrated. Accordingly, the tone change in the tone images may be easily identified.

According to the computer device 20 that has been described in detail, a user viewing a confirmation image may easily confirm the effect of the calibration, by selecting a confirmation image suitable for the contents of calibration.

<Description of Programs>

In the above-described exemplary embodiments, the processes performed by the computer device 20 are prepared as programs such as application software.

Accordingly, in the present exemplary embodiment, the processes performed by the computer device 20 may be regarded as a program that causes a computer to execute image processing including acquiring a color reproduction characteristic of the display device 30, correcting the color reproduction characteristic, extracting a feature amount which is an object of the correction of the acquired color reproduction characteristic, and selecting, based on the feature amount, an evaluation image which is a source for generating a confirmation image including (i) an image when the acquired color reproduction characteristic before the correction is used and (ii) an image when the color reproduction characteristic after the correction is used.

In addition, the programs that implement the present exemplary embodiments are provided by a communication unit, and may also be provided in a state of being stored in a recording medium such as a CD-ROM.

While the exemplary embodiments of the present invention have been described, the technical scope of the present invention is not limited to the exemplary embodiments. From the descriptions of the claims, it is clear that the technical scope of the present invention includes various modifications or improvements of the present exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a processor configured to execute:
a color reproduction characteristic acquiring unit that acquires a color reproduction characteristic of a display device;
a color reproduction characteristic correction unit that corrects the color reproduction characteristic;
a feature amount extraction unit that extracts a feature amount which is an object of the correction of the color reproduction characteristic acquired by the color reproduction characteristic acquiring unit; and
an evaluation image selecting unit that selects, based on the feature amount, an evaluation image, among a plurality of evaluation images,
wherein the selected evaluation image is a source for generating a confirmation image that is suitable for contents of calibration,
wherein the confirmation image includes (i) an image when the color reproduction characteristic acquired by the color reproduction characteristic acquiring unit and before the correction is used and (ii) an image when the color reproduction characteristic after the correction by the color reproduction characteristic correction unit is used,
wherein the feature amount is extracted using a deviation of the color reproduction characteristic, and
wherein the deviation is determined by comparing a first color correspondence relationship at the evaluation point and a second color correspondence relationship at the target point.

2. The image processing device according to claim 1, further comprising:
a confirmation image generating unit that changes, according to the feature amount, (i) the image when the color reproduction characteristic before the correction is used and (ii) the image when the color reproduction characteristic after the correction is used, to generate the confirmation image.

3. The image processing device according to claim 2, wherein the confirmation image generating unit generates an image representing tone characteristics, as the confirmation image.

4. The image processing device according to claim 2, wherein the confirmation image generating unit makes (i) a background of the image when the color reproduction characteristic before the correction is used and (ii) a background of the image when the color reproduction characteristic after the correction is used, in black.

5. The image processing device according to claim 3, wherein the confirmation image generating unit makes (i) a background of the image when the color reproduction characteristic before the correction is used and (ii) a background of the image when the color reproduction characteristic after the correction is used, in black.

6. The image processing device according to claim 1, wherein the color reproduction characteristic is a relationship between (i) colorimetric image data which is image data of a colorimetric image and (ii) color data of an image which is displayed when the colorimetric image data is input to the display device.

7. The image processing device according to claim 2, wherein the color reproduction characteristic is a relationship between (i) colorimetric image data which is image data of a colorimetric image and (ii) color data of an image which is displayed when the colorimetric image data is input to the display device.

8. The image processing device according to claim 3, wherein the color reproduction characteristic is a relationship between (i) colorimetric image data which is image data of a colorimetric image and (ii) color data of an image which is displayed when the colorimetric image data is input to the display device.

9. The image processing device according to claim 4, wherein the color reproduction characteristic is a relationship between (i) colorimetric image data which is image data of a colorimetric image and (ii) color data of an image which is displayed when the colorimetric image data is input to the display device.

10. The image processing device according to claim 5, wherein the color reproduction characteristic is a relationship between (i) colorimetric image data which is image data of a colorimetric image and (ii) color data of an image which is displayed when the colorimetric image data is input to the display device.

11. An image processing system comprising:
a display device that displays an image; and
an image processing device that corrects a color reproduction characteristic of an image displayed by the display device, wherein
the image processing device comprises:
a processor configured to execute:
a color reproduction characteristic acquiring unit that acquires the color reproduction characteristic of the display device,
a color reproduction characteristic correction unit that corrects the color reproduction characteristic,
a feature amount extraction unit that extracts a feature amount which is an object of the correction of the color reproduction characteristic acquired by the color reproduction characteristic acquiring unit, and
an evaluation image selecting unit that selects, based on the feature amount, an evaluation image, among a plurality of evaluation images,
wherein the selected evaluation image is a source for generating a confirmation image that is suitable for contents of calibration,
wherein the confirmation image includes (i) an image when the color reproduction characteristic acquired by the color reproduction characteristic acquiring unit and before the correction is used and (ii) an image when the color reproduction characteristic after the correction by the color reproduction characteristic correction unit is used,
wherein the feature amount is extracted using a deviation of the color reproduction characteristic, and
wherein the deviation is determined by comparing a first color correspondence relationship at the evaluation point and a second color correspondence relationship at the target point.

12. A non-transitory computer readable storage medium storing a program that causes a computer to execute image processing, the image processing comprising:
acquiring a color reproduction characteristic of a display device;
correcting the color reproduction characteristic;
extracting a feature amount which is an object of the correction of the acquired color reproduction characteristic; and
selecting, based on the feature amount, an evaluation image, among a plurality of evaluation images,
wherein the selected evaluation image is a source for generating a confirmation image that is suitable for contents of calibration,
wherein the confirmation image includes (i) an image when the acquired color reproduction characteristic before the correction is used and (ii) an image when the color reproduction characteristic after the correction is used,
wherein the feature amount is extracted using a deviation of the color reproduction characteristic, and
wherein the deviation is determined by comparing a first color correspondence relationship at the evaluation point and a second color correspondence relationship at the target point.

13. The image processing device according to claim 1, wherein the evaluation image selecting unit selects an image, among plurality of images, having a value associated with the features amount, as the evaluation image.

14. The image processing device according to claim 1, wherein the evaluation image selecting unit selects the evaluation image from among plurality of evaluation images, after the feature amount is extracted.

15. The image processing device according to claim 1, wherein the confirmation image includes the selected evaluation image as the image when the acquired color reproduction characteristic before the correction is used.

16. The image processing device according to claim 1, wherein the first color correspondence relationship is determined by converting a first colorimetric image data into a first color value of a device-independent color space at the evaluation point, and
wherein the second color correspondence relationship is determined by converting a second colorimetric image data into a second color value of the device-independent color space at the target point.

17. The image processing device according to claim 1, wherein the evaluation point is different from the target point on the device-independent color space.

\* \* \* \* \*